United States Patent [19]
Massaro

[11] Patent Number: 5,324,058
[45] Date of Patent: Jun. 28, 1994

[54] BICYCLE SEAT SHOCK ABSORBING APPARATUS

[76] Inventor: Bruce A. Massaro, 401 Rainbow St., Thunder Bay, Ontario, Canada, P7B 6R2

[21] Appl. No.: 36,552

[22] Filed: Mar. 24, 1993

[51] Int. Cl.5 .............................................. B62J 1/04
[52] U.S. Cl. ................... 280/283; 248/600; 280/220; 297/215.13; 297/344.20
[58] Field of Search ....... 288/220, 283, 287; 297/209, 208, 215.13, 344.2; 248/598, 600

[56] References Cited

U.S. PATENT DOCUMENTS

| | | | |
|---|---|---|---|
| 3,891,236 | 6/1975 | Kuwano et al. | 280/283 |
| 4,736,983 | 4/1988 | Furbee | 297/209 |
| 5,044,648 | 9/1991 | Knapp | 280/283 |
| 5,094,424 | 3/1992 | Hartway | 280/220 |

Primary Examiner—Mitchell J. Hill
Attorney, Agent, or Firm—E. Michael Combs

[57] ABSTRACT

A bicycle seat frame having a seat post receiving a cylindrical first tube reciprocatably and slidably mounted within a second tube, with the first tube arranged to receive an adjustor rod and valve dampening structure that extends from the second tube into the first tube, with the adjustor rod having a valve plate operative within a fluid oil bath to dampen impact directed through the bicycle frame to the associated bicycle seat. A spring is interposed between the first tube and the second tube floor to bias the second tube relative to the first tube in a projected relationship.

5 Claims, 4 Drawing Sheets

BICYCLE SEAT SHOCK ABSORBING APPARATUS

BACKGROUND OF THE INVENTION

1. Field of the Invention

The field of invention relates to shock absorbing apparatus, and more particularly pertains to a new and improved bicycle seat shock absorbing apparatus wherein the same is directed to dampening impact and vibration directed through the bicycle seat frame to an associated bicycle seat.

2. Description of the Prior Art

Shock absorbing apparatus, and particularly of bicycle seat shock absorbing structure, has been indicated in U.S. Pat. No. 4,736,983 wherein a post is mounted within a sleeve having a spring mounted about the post, further oriented to prevent rotation of the post and the sleeve structure.

U.S. Pat. Nos. 3,481,628; 4,789,174; and 4,182,508 are further examples of bicycle seat shock absorbing and cushioning structure.

The instant invention attempts to overcome deficiencies of the prior art in providing a shock absorbing structure employing a fluid oil bath effecting dampening relative to a first tube directed into a second tube adjustably mounting the first tube relative to the second tube employing an adjuster rod structure and in this respect, the present invention substantially fulfills this need.

SUMMARY OF THE INVENTION

In view of the foregoing disadvantages inherent in the known types of shock absorbing apparatus now present in the prior art, the present invention provides a bicycle seat shock absorbing apparatus wherein a shock absorbing tubular structure is mounted within a bicycle seat support post supporting the bicycle seat in a shock absorbing relationship relative to the bicycle frame. As such, the general purpose of the present invention, which will be described subsequently in greater detail, is to provide a new and improved bicycle seat shock absorbing apparatus which has all the advantages of the prior art shock absorbing apparatus and none of the disadvantages.

To attain this, the present invention provides a bicycle seat frame having a seat post receiving a cylindrical first tube reciprocatably and slidably mounted within a second tube, with the first tube arranged to receive an adjustor rod and valve dampening structure that extends from the second tube into the first tube, with the adjustor rod having a valve plate operative within a fluid oil bath to dampen impact directed through the bicycle frame to the associated bicycle seat. A spring is interposed between the first tube and the second tube floor to bias the second tube relative to the first tube in a projected relationship.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle seat shock absorbing apparatus which has all the advantages of the prior art shock absorbing apparatus and none of the disadvantages.

It is another object of the present invention to provide a new and improved bicycle seat shock absorbing apparatus which may be easily and efficiently manufactured and marketed.

It is a further object of the present invention to provide a new and improved bicycle seat shock absorbing apparatus which is of a durable and reliable construction.

An even further object of the present invention is to provide a new and improved bicycle seat shock absorbing apparatus which is susceptible of a low cost of manufacture with regard to both materials and labor, and which accordingly is then susceptible of low prices of sale to the consuming public, thereby making such bicycle seat shock absorbing apparatus economically available to the buying public.

Still yet another object of the present invention is to provide a new and improved bicycle seat shock absorbing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
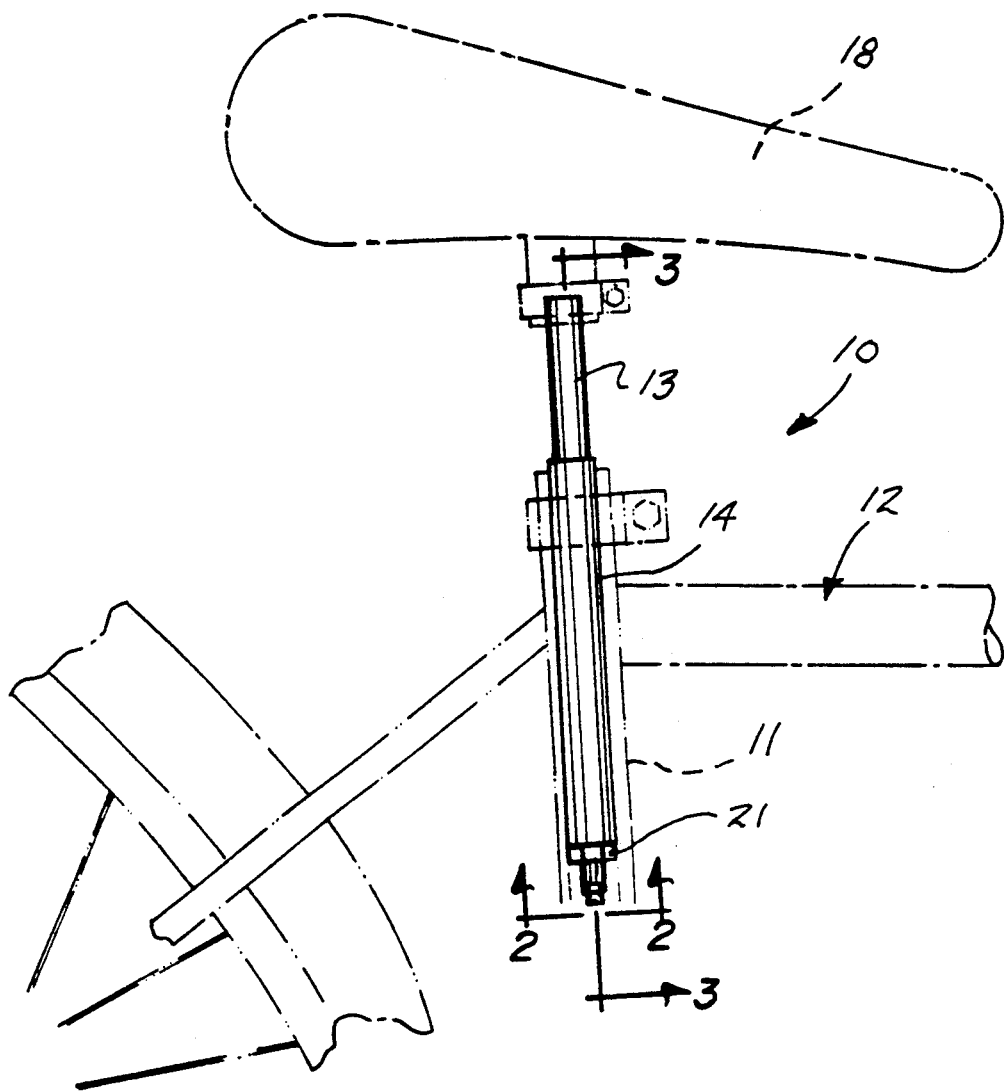
FIG. 1 is an orthographic view of the shock absorbing structure mounted within an associated bicycle frame.
Figure 2:
FIG. 2 is an orthographic view, taken along the lines 2—2 of FIG. 1 in the direction indicated by the arrows.
Figure 3:
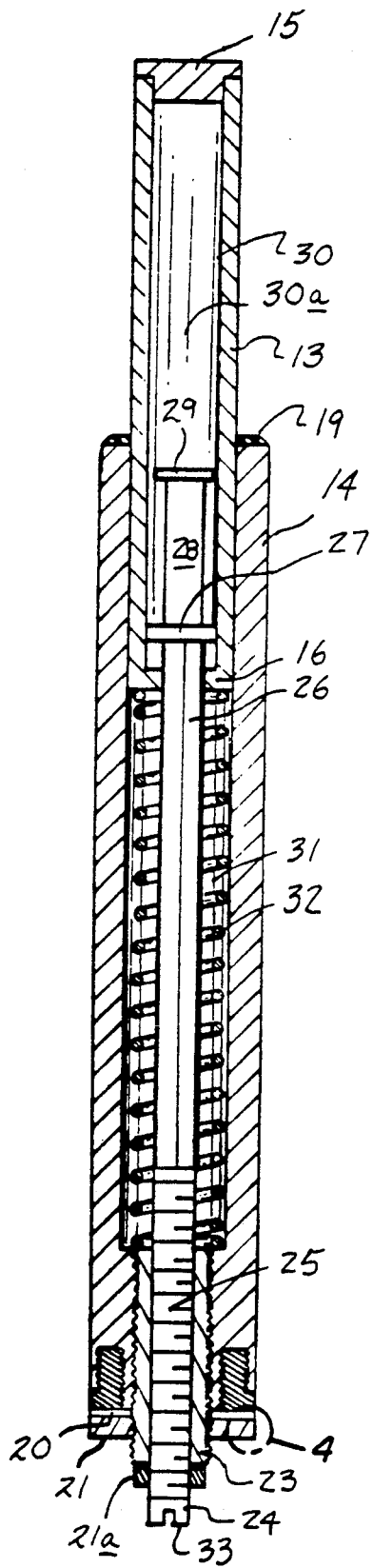
FIG. 3 is an orthographic view, taken along the lines 3—3 of FIG. 1 in the direction indicated by the arrows.
Figure 4:
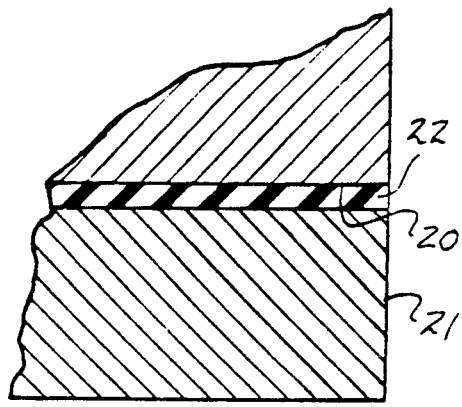
FIG. 4 is an enlarged orthographic view of section 4 as set forth in FIG. 3.

With reference now to the drawings, and in particular to FIGS. 1 to 8 thereof, a new and improved bicycle seat shock absorbing apparatus embodying the principles and concepts of the present invention and generally designated by the reference numeral 10 will be described.

More specifically, the bicycle seat shock absorbing apparatus 10 is arranged in combination with a bicycle frame 12 having a bicycle seat post 11 fixedly mounted relative to the frame, with a bicycle seat post 11 receiving a cylindrical second tube 14 within the frame, and the second tube 14 slidably receives in a coaxially aligned relationship a cylindrical first tube 13. The first tube 13 having a first tube first end 15 mounting the associated bicycle seat 18 thereto, with a first tube second end 16 directed into the second tube 14, having a polygonal bore 17 directed through the first tube second end 16, with the polygonal bore coaxially aligned relative to the first and second tubes 13 and 14. A second tube first end having an entrance opening receiving the first tube 13 therein to the second tube is arranged in a spaced relationship relative to a second tube second end 20 mounting a first locking cap 21, including a sealing web 22 interposed between the first locking cap 21 and the second tube second end 20 (see FIGS. 3 and 4). An externally threaded adjuster sleeve 23 is threadedly directed through the first locking cap 21 and threadedly directed into the second tube 14 from the second tube second end in a threaded inter-engaging relationship to coaxially adjust the adjustor sleeve 23. The adjustor sleeve 23 includes an internally threaded bore threadedly receiving an adjustor rod 24 therethrough, with the adjustor rod 24 including an adjustor rod threaded portion 25 threadedly directed through the adjustor sleeve internally threaded bore, with the adjustor rod 24 including an adjustor rod polygonal body portion 26 extending from the threaded portion 25 into the first sleeve 13 complementarily and slidably through the polygonal bore 17 preventing rotation of the first tube 13 maintaining alignment of the bicycle seat 18 when positioned upon the first tube first end. An abutment plate 27 is fixedly mounted to the adjustor rod 24 within the first tube between the first tube first end and the first tube second end limiting coaxial sliding of the first tube relative to the second tube. An extension shank 28 extends from the abutment plate 27 in a coaxially aligned relationship relative to the adjustor rod first end, wherein the adjustor rod first end mounts a valve plate 29. As the first tube includes a first tube cavity 30, with the second tube having a second tube cavity 31, with the first and second tube cavities 30 and 31 filled with a dampening fluid of any desired type, such as dampening fluid 30a, wherein projection of the first tube into the second tube is dampened by inner action of the valve plate 29 within the dampening fluid 30a, as the valve plate 29 is spaced from the interior side walls of the first tube cavity 30. A second tube spring 32 is interposed between the first tube second end and the adjuster sleeve 23. In this manner, selective compression of the spring 32 relative to the first tube is effected by threaded displacement in a coaxially aligned manner of the adjustor sleeve 23 relative to the first tube second end, with the adjustor rod 25 limiting coaxial displacement of the first tube relative to the second tube by orientation of the abutment plate 27 relative to the first tube second end. The adjustor rod 25 and more specifically, the adjustor rod second end includes a torque engaging member such as a slot as indicated to receive a screwdriver and the like for ease of rotation of the adjustor rod relative to the adjustor sleeve. It is understood that any torque receiving structure may be employed, such as a hexagonal head, etc.

Figure 5:
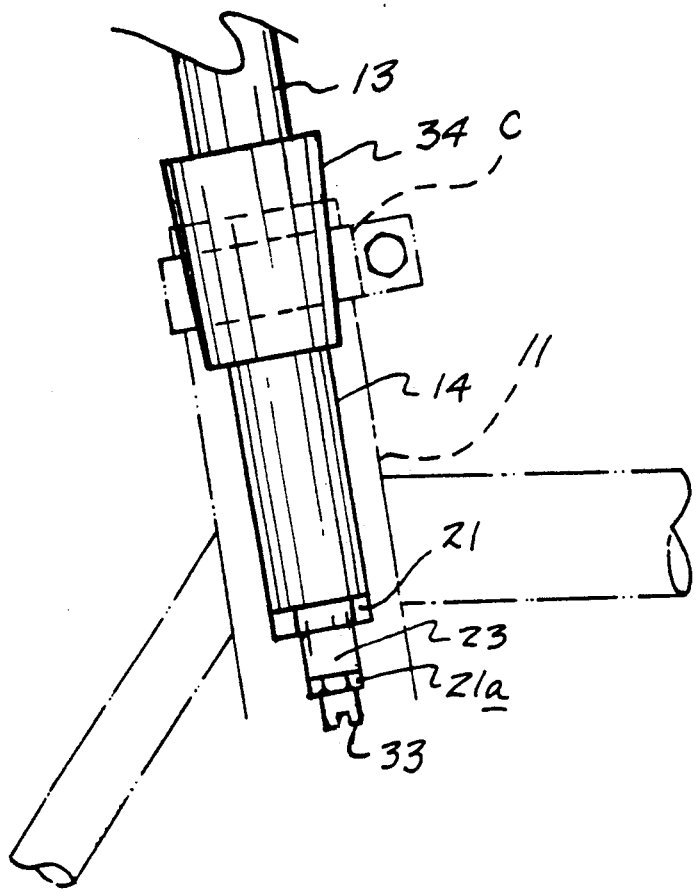
FIG. 5 is an orthographic side view of an adaptor sleeve mounted within the first tube and the bicycle seat post.
Figure 6:
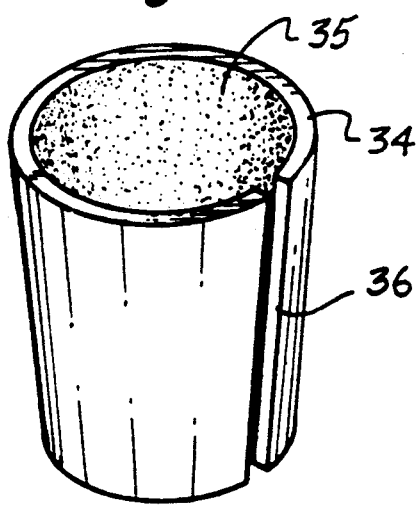
FIG. 6 is an isometric illustration of the adaptor sleeve.

The FIGS. 5 and 6 indicate the use of a conical adaptor sleeve 34 arranged for positioning about the second tube 14, with the adaptor sleeve 34 having a conical interior surface 35 of a roughened texture to enhance grasping of the second tube 14, with an elongate adaptor sleeve slot 36 directed along the exterior wall of the adaptor sleeve from the first end to the second end permitting clamping of the second tube permitting positioning of the second tube within a variety of seat posts of varying diameters.

Figure 7:
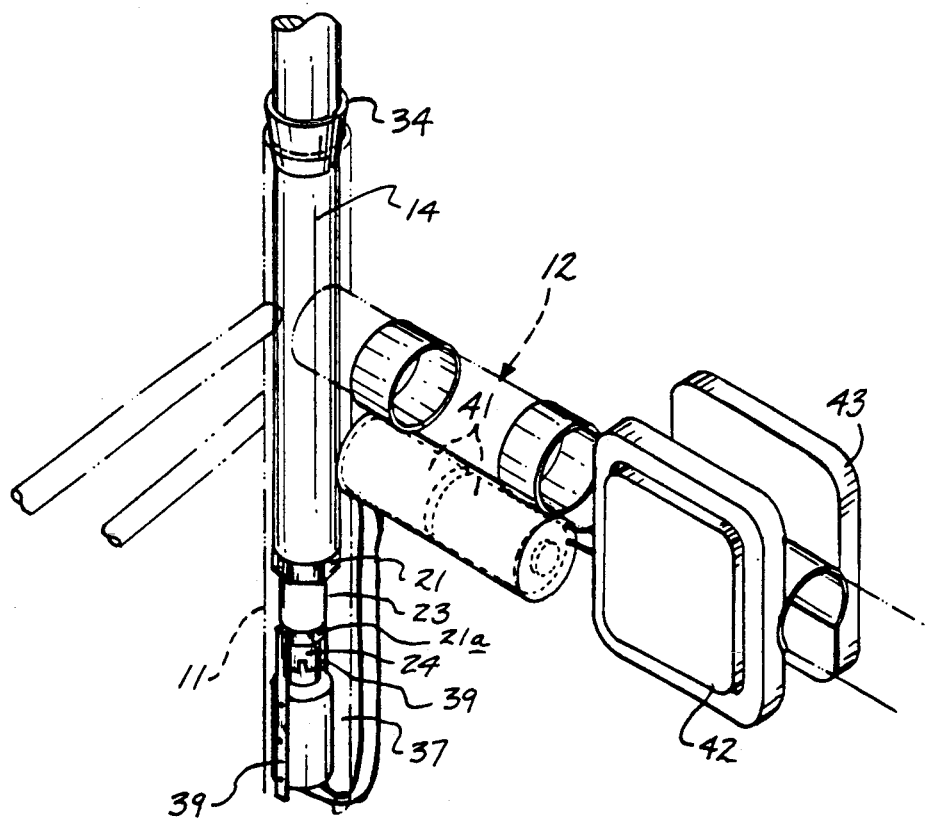
FIG. 7 is an isometric illustration of a modified aspect of the invention employing a reversible drive motor.
Figure 8:
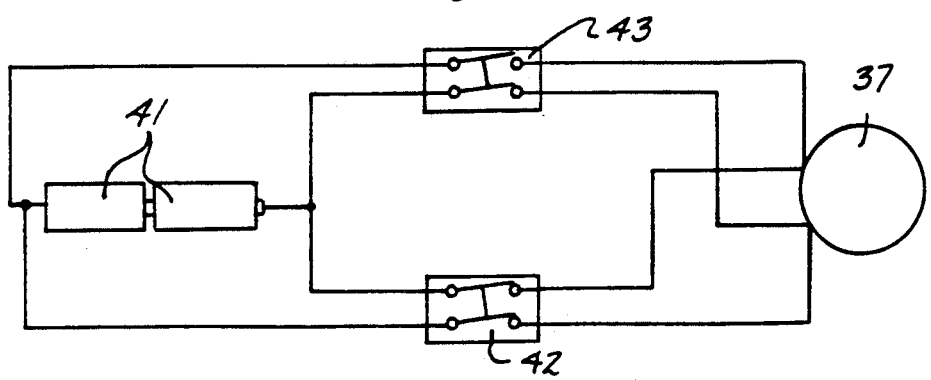
FIG. 8 is a diagrammatic electrical illustration of the drive motor inter-relationship relative to switch pads mounted to the bicycle seat frame.

The FIGS. 7 and 8 indicates the use of a reversible drive motor 37 mounted within the seat post, having a reversible motor output shaft 38 in engagement with the adjustor rod second end 33. Mounting flanges 39 fixedly secure the motor 37 to the adjustor sleeve 23. In this manner, actuation of the reversible motor permits projection or retraction of the adjustor rod 24 relative to the adjustor sleeve permitting adjustment of the abutment plate 27 relative to the first tube 13 permitting ease of such adjustment during a riding procedure limiting the need for removal of the structure relative to the seat post and having a means for a rider of the bike to continuously adjust the structure during use. To this end, a battery tube 40 is mounted to the bicycle frame 12 having a plurality of battery members 41 therewithin. A first and second switch pad 42 and 43 are mounted to the bicycle frame, with the first and second switch pads arranged in a parallel coextensive relationship on diametrically opposed sides of a horizontal tube of the seat frame permitting an individual's knees to engage selectively the first or second switch pads 42 and 43 to provide for rotation and selective contra-rotation of the drive motor in adjusting the adjustor rod 24 relative to the second tube 14.

It should be noted that the securement of the shock absorbing structure within the bicycle seat post 11 is accomplished by the clamp "C" arranged in surrounding relationship relative to the bicycle seat post 11 and about the adaptor sleeve 34 to effect simultaneous engagement of the post 11, the adaptor sleeve 34, and the second tube 14.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A bicycle seat shock absorbing apparatus arranged for mounting to a bicycle seat frame, with the bicycle seat frame including a bicycle seat post, with the apparatus comprising, a cylindrical first tube slidably and coaxially received within a cylindrical second tube, with the second tube positioned within the bicycle seat post, the first tube having a first tube first end mounting a bicycle seat thereon, and the first tube having a first tube second end positioned within the second tube, with the second tube including a second tube first end and a second tube second end, and the first tube second end is directed into the second tube through the second tube first end, the second tube second end having a locking cap, and a sealing web interposed between the locking cap and the second tube second end, with an externally threaded adjustor sleeve threadedly directed through the locking cap and threadedly directed into the second tube through the second tube second end, with the second tube having a second tube cavity, and the adjustor sleeve directed from the second tube second end to the second tube cavity, and, an adjustor rod having a first externally threaded portion, with the first externally threaded portion threadedly received within the adjustor sleeve, with the adjustor sleeve, the adjustor rod, the first tube and second coaxially aligned relative to one another, and, a spring member mounted within the second tube cavity and the adjustor rod having an adjustor rod first end positioned exteriorly beyond the adjustor sleeve, and the adjustor rod having an adjustor rod second end positioned within the first tube, and the adjustor rod first end including a valve plate, with the first tube having a first tube cavity, with the first tube cavity and the second tube cavity including a fluid oil dampening fluid contained therewithin, wherein the valve plate is arranged for inner action with the dampening fluid to effect dampening in cooperation with the spring of impact directed through the bicycle frame.

2. An apparatus as set forth in claim 1 wherein the spring is directed coextensively between the adjustor sleeve and the first tube second end in abutting engagement with the adjustor sleeve and the first tube second end, with the first tube second end including a polygonal bore, and the rod includes a polygonal body portion extending from the threaded portion through the polygonal bore, and an abutment plate mounted fixedly to the adjustor rod within the first tube between the first tube second end and the valve plate, with an extension shank directed between the valve plate and the abutment plate.

3. An apparatus as set forth in claim 2 including a conical adaptor sleeve mounted in surrounding relationship relative to the second tube, and wherein the conical adaptor sleeve is arranged for reception within the bicycle seat post, with a clamp arranged in surrounding relationship relative to the adaptor sleeve and the bicycle seat post and the second tube for simultaneous securement of the adaptor sleeve, the bicycle seat post, and the second tube relative to the bicycle frame.

4. An apparatus as set forth in claim 3 wherein the adaptor sleeve includes a conical interior roughened surface in contiguous engagement with the second tube.

5. An apparatus as set forth in claim 4 wherein the adjustor rod includes an adjustor rod first end having the valve plate fixedly mounted thereon, and the adjustor rod having a second end, with a reversible motor mounted to the adaptor sleeve, and the reversible motor including an output shaft, and the output shaft is arranged in fixed securement to the adjustor rod second end spaced from the adjustor rod first end, and a battery tube secured to the bicycle frame, including at least one battery member therewithin, and a first switch pad and a second switch pad mounted to the bicycle frame, with the first switch pad and the second switch pad positioned on opposed sides of a horizontal tube portion of the bicycle frame, wherein the first switch pad and the second switch pad permit selective rotation and contra-rotation respectively of the reversible motor through the battery member.

* * * * *